US011292443B2

(12) United States Patent
Walter et al.

(10) Patent No.: US 11,292,443 B2
(45) Date of Patent: Apr. 5, 2022

(54) METHOD FOR THE FUNCTIONAL TESTING OF AN ELECTROMECHANICAL FILL LEVEL MONITORING DEVICE

(71) Applicant: Robert Bosch GmbH, Stuttgart (DE)

(72) Inventors: Klaus Walter, Bietigheim-Bissingen (DE); Peter Ziegler, Grossbottwar (DE); Matthias Kistner, Bretzfeld (DE); Ralf Kinder, Auenstein (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 16/759,841

(22) PCT Filed: Sep. 20, 2018

(86) PCT No.: PCT/EP2018/075428
§ 371 (c)(1),
(2) Date: Apr. 28, 2020

(87) PCT Pub. No.: WO2019/105628
PCT Pub. Date: Jun. 6, 2019

(65) Prior Publication Data
US 2021/0179043 A1 Jun. 17, 2021

(30) Foreign Application Priority Data
Nov. 30, 2017 (DE) .......................... 102017221478.3

(51) Int. Cl.
*B60T 17/22* (2006.01)
*B60T 8/40* (2006.01)
(Continued)

(52) U.S. Cl.
CPC ............ *B60T 8/4081* (2013.01); *B60T 7/042* (2013.01); *B60T 13/146* (2013.01);
(Continued)

(58) Field of Classification Search
CPC ... B60T 17/06; B60T 17/225; B60T 2270/406
See application file for complete search history.

(56) References Cited

U.S. PATENT DOCUMENTS 4,318,078 A    3/1982   Reinartz et al.
4,489,224 A   12/1984   Steer
(Continued)

FOREIGN PATENT DOCUMENTS

CN    102470849 A    5/2012
CN    102858608 A    1/2013
(Continued)

OTHER PUBLICATIONS

International Search Report for PCT/EP2018/075428, dated Nov. 27, 2018.

*Primary Examiner* — Bradley T King
(74) *Attorney, Agent, or Firm* — Norton Rose Fulbright US LLP; Gerard Messina

(57) ABSTRACT

A method for functional testing of an electromechanical fill level monitoring device. In order to test the plausibility of a signal emitted by a fill level monitoring device of a first pressure medium chamber, a forced actuation of this fill level monitoring device is carried from time to time. This forced actuation is carried out in that a pressure medium delivery unit in a pressure medium circuit having the first pressure medium chamber is activated for a predefined period. This delivers the pressure medium fill level monitoring device into a second pressure medium chamber via a pressure medium connection. On the basis of the signal profile output by the fill level monitoring device, the proper operation of the fill level monitoring device is inferred in the electronic control unit.

7 Claims, 3 Drawing Sheets

(51) Int. Cl.
*B60T 7/04* (2006.01)
*B60T 13/14* (2006.01)
*B60T 13/66* (2006.01)
*B60T 13/68* (2006.01)
*B60T 13/74* (2006.01)

(52) U.S. Cl.
CPC .......... *B60T 13/662* (2013.01); *B60T 13/686* (2013.01); *B60T 13/745* (2013.01); *B60T 17/225* (2013.01)

(56) References Cited

U.S. PATENT DOCUMENTS

| | | | |
|---|---|---|---|
| 4,557,528 A | 12/1985 | Leiber | |
| 4,741,160 A * | 5/1988 | Leiber | B60T 8/94 60/535 |
| 5,501,294 A * | 3/1996 | Chih-Chun | B60K 28/10 180/271 |
| 7,977,591 B2 * | 7/2011 | Mantua | G01F 23/703 200/84 R |
| 10,814,855 B1 * | 10/2020 | Ganzel | F16K 21/185 |
| 2004/0245848 A1 | 12/2004 | Fraisse et al. | |
| 2011/0175436 A1 * | 7/2011 | Nakata | B60T 13/662 303/6.01 |
| 2012/0038209 A1 * | 2/2012 | Yamamoto | B60T 17/06 303/9.63 |
| 2016/0075318 A1 | 3/2016 | Ahn et al. | |
| 2018/0111592 A1 * | 4/2018 | Jung | B60T 17/225 |
| 2020/0070797 A1 * | 3/2020 | Plewnia | B60T 15/041 |
| 2021/0053546 A1 * | 2/2021 | Plewnia | G01F 25/0061 |
| 2021/0155215 A1 * | 5/2021 | Ganzel | B60T 8/326 |
| 2021/0291800 A1 * | 9/2021 | Jesse | B60T 8/94 |

FOREIGN PATENT DOCUMENTS

| | | |
|---|---|---|
| CN | 204821534 U | 12/2015 |
| CN | 107000718 A | 8/2017 |
| DE | 2726465 A1 | 12/1978 |
| DE | 112008002155 T5 | 6/2010 |
| DE | 102015223670 A1 | 9/2016 |
| DE | 102015225057 A1 | 6/2017 |
| GB | 1600703 A | 10/1981 |
| JP | 2008207664 A | 9/2008 |
| JP | 2009113605 A | 5/2009 |
| JP | 2010058709 A | 3/2010 |
| JP | 2015182631 A | 10/2015 |
| KR | 19980019835 A | 6/1998 |
| KR | 20100005357 A | 1/2010 |
| KR | 20140066032 A | 5/2014 |
| WO | 2016146277 A1 | 9/2016 |

\* cited by examiner

METHOD FOR THE FUNCTIONAL TESTING OF AN ELECTROMECHANICAL FILL LEVEL MONITORING DEVICE

FIELD

The present invention is directed to a method for the functional testing of an electromechanical fill level monitoring.

BACKGROUND INFORMATION

Fill level monitoring devices have been installed in motor vehicles for many years, in order to promptly detect a low level of brake fluid in a brake fluid reservoir and, if necessary, display this to a driver.

For this purpose, conventional fill level monitoring devices have a float gauge situated in the brake fluid reservoir, which carries a magnet. This float gauge moves, depending on the fill level of the brake fluid reservoir, on a sensor element equipped with a switch contact, for example, a reed contact. As soon as the fill level drops below a minimum mark, a switching operation is triggered by the magnet in the sensor element, which causes a warning signal to be emitted to a driver by an electronic control unit. Visual, acoustic, and/or haptic signals are customary as warning signals.

Continuously acting fill level monitoring devices are also conventional. These have a potentiometer actuated by the float gauge, whose resistance changes depending on the float gauge position and thus of the fill level of the brake fluid reservoir.

Under normal operating conditions, the fluid level in a pressure medium chamber is above the aforementioned minimum mark over the long term and the float gauge moves only within a relatively small displacement range. As a consequence, no switching operation is triggered at the switch contact or no resistance change is triggered at the potentiometer, and the fill level monitoring device appropriately emits a signal which represents the sufficiently high fill level.

However, in the case that the float gauge is, for example, mechanically blocked, and therefore a potential fill level drop may no longer be detected, or if the sensor element has stalled contacts, then a fill level, which has dropped below the minimum volume, may no longer be easily detected, and the warning signal to the driver fails to appear.

In an extreme case, gas from the atmosphere might thus penetrate into the hydraulic circuit, or ultimately the buildup of brake pressure by a pressure generator might be compromised, without this having been noticed. This is particularly critical in so-called power brake systems, which buildup brake pressure independently from the driver and are additionally configured as open systems, i.e., as braking systems whose brake pressure generator is supplied with pressure medium directly from a pressure medium chamber of a reservoir.

SUMMARY

Using an example method of the present invention for functional testing of an electromechanical fill level monitoring device prevents functional failures of this fill level monitoring device from remaining undetected for longer periods.

According to an example embodiment of a method in accordance with the present invention, a response of the brake fluid switch is provoked by a targeted reduction of the fill level of a first pressure medium chamber equipped with a fill level monitoring device, and the signal profile thereby emitted is observed by the fill level monitoring device. If, in the observation period, a signal jump or at least a continuous signal change occurs, depending on the functional principle of a sensor of the fill level monitoring device, it may be inferred that the fill level monitoring device is functioning properly and the output of a warning signal may be suppressed in the control unit, while a lack of a signal jump or an inconsistent or discontinuous signal change may be interpreted as an error function of the fill level monitoring device and triggers such a warning signal.

The method may then always be carried out when no pressure medium delivery takes place in the hydraulic circuit, thus when the pressure medium delivery device is not activated or actuated for brake pressure generation. In a motor vehicle, the method may be routinely carried out, for example, always after a start of the vehicle drive or after starting up the vehicle following an idle phase.

The aforementioned drop of the fill level in a first pressure medium chamber may be carried out on the basis of a pressure medium delivery device, which is usually present in a hydraulic circuit anyway. In particular, brake circuits of electronically slip-controllable vehicle braking systems are equipped with pressure generators or pressure medium delivery devices, which may be used for this purpose. In addition, only minor additional modifications are necessary at these types of brake circuits in order to be able to carry out the described method. For example, a second pressure medium chamber is provided, into which the pressure medium may be pumped from the first pressure medium chamber.

The two pressure medium chambers should advantageously be in permanent communication with one another via an equalizing opening of a known cross-sectional area. The circulated pressure medium may thus automatically, i.e., without pump assistance, flow back into the first pressure medium chamber via the equalizing opening, further information regarding temperature, viscosity, and/or degree of contamination, thus the quality, of the pressure medium being obtained from a measurable duration of the return flow of the pressure medium, and may be taken into consideration in regulating the brake pressure in the brake circuit. Particularly advantageous in this regard are reservoirs for pressure medium, which are divided into two pressure medium chambers communicating with one another, since they may already be inexpensively obtained on the market.

Additional advantages or advantageous refinements of the method underlying the present invention arise from the description below and the figures.

BRIEF DESCRIPTION OF THE DRAWINGS

An exemplary embodiment of the present invention is described in greater detail in the subsequent description and illustrated on the basis of the figures.

DETAILED DESCRIPTION OF EXAMPLE EMBODIMENTS

Figure 1:
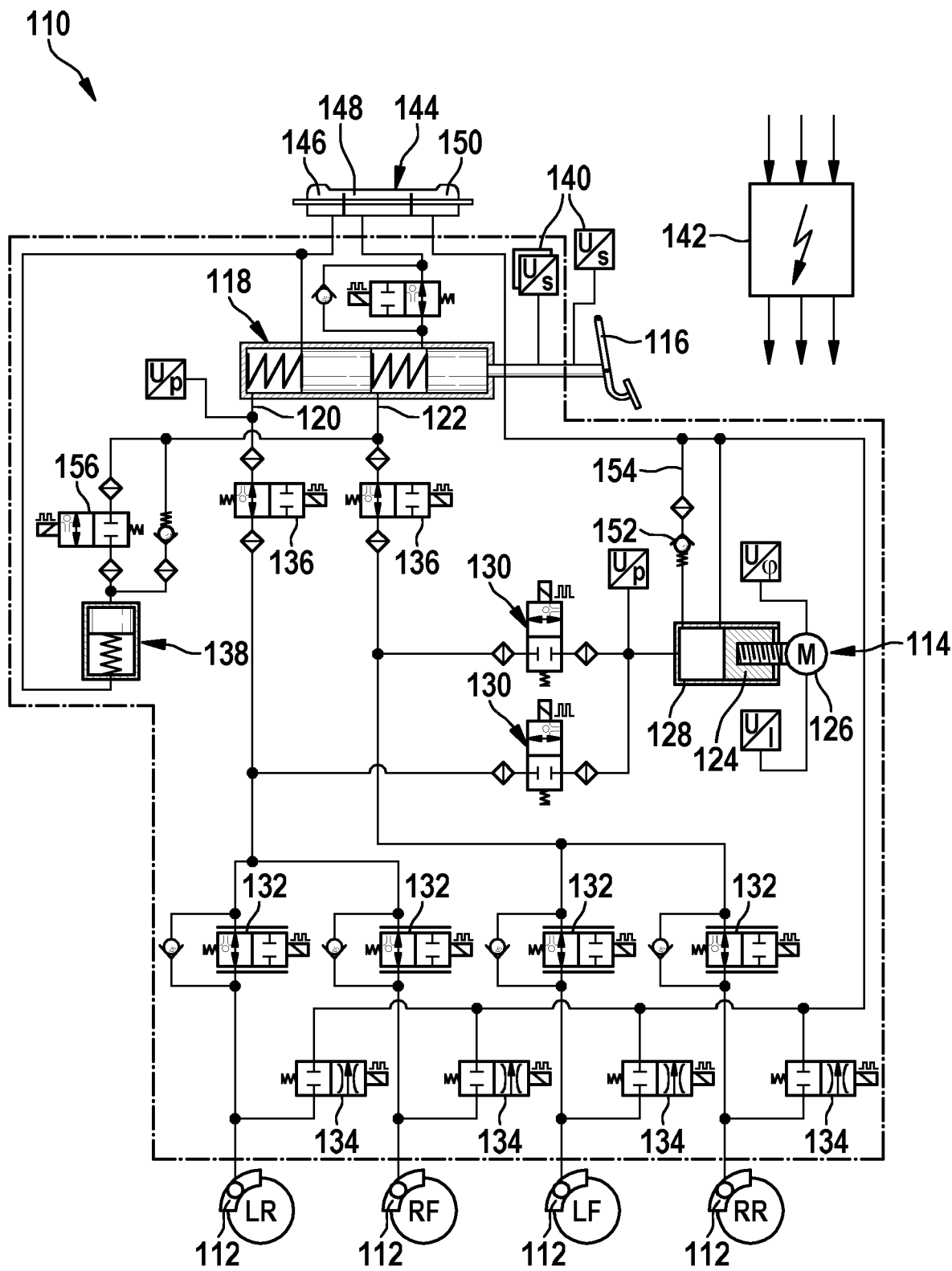
FIG. 1 shows the hydraulic layout of an electronic slip-controllable power braking system of a motor vehicle.

FIG. 1 shows by way of example the hydraulic layout of a vehicle braking system 110. This vehicle braking system 110 is a power braking system, thus a vehicle braking system in which the brake pressure at the wheel brakes 112 is not provided by the muscle force of the driver in problem-free normal operation, but instead by a pressure generator 114, which is equipped to be drivable by an electric motor. Depicted vehicle braking system 110 includes a master brake cylinder 118, which is actuatable by the driver via braking pedal 116 and to which two brake circuits 120, 122 are connected. Both brake circuits 120, 122 each supply two assigned wheel brakes 112 with pressure medium. On the basis of master brake cylinder 118, a braking intent of the driver is merely detected under normal operations; only in the case of present malfunctions may the driver apply brake pressure to the wheel brakes 112 via master brake cylinder 118. During standard operation of vehicle braking system 110, brake pressure is therefore applied to wheel brakes 112 using a pressure generator 114. This pressure generator 114 is hydraulically switched in parallel to master brake cylinder 118. Pressure generator 114 is a plunger piston 124, which may be driven to an axial motion in a cylinder 128 by an electrically activatable drive motor 126. A rotary motion of drive motor 126 is thereby converted with the aid of a spindle drive into an axial motion and transmitted to plunger piston 124. The pressure medium supplied by plunger piston 124 is displaced into brake circuits 120, 122 and thus causes a buildup of brake pressure. Brake circuits 120, 122 may be separated if necessary from plunger piston 124 via check valves 130, these check valves 130 being designed to be electronically activatable. For an individual wheel adjustment of the brake pressure to the slip ratio prevailing at an assigned wheel, a modulation device, made from an electronically activatable pressure build-up valve 132 and a likewise electronically activatable pressure reduction valve 134, is connected upstream or downstream. In addition, a circuit separating valve 136 is provided in each of the brake circuits 120, 122. This circuit separating valve 136 is likewise designed to be electronically controllable and blocks a pressure medium connection between master brake cylinder 118 and brake circuits 120, 122 under normal conditions to prevent a buildup of brake pressure therein via master brake cylinder 118.

Vehicle braking system 110 is additionally equipped with a pedal travel simulator 138. This is a piston/cylinder unit, which is controllable with the aid of a simulator decoupling valve 156 and may be coupled to one of the chambers of master brake cylinder 118. Pedal travel simulator 138 receives pressure medium displaced from master brake cylinder 118 when the pressure medium connection from master brake cylinder 118 to brake circuits 120, 122 is blocked by circuit separating valve 136 and then facilitates a pedal travel to brake pedal 116, actuated by the driver and acted upon by master brake cylinder 118. Pedal sensors 140 at brake pedal 116 detect this pedal travel and convert the travel signal into a voltage signal which they provide to an electronic control unit 142 of vehicle braking system 110. A braking intent of the driver is recognized in electronic control unit 142 on the basis of this signal and converted into a control signal, with which electronic control unit 142 activates pressure generator 114 or its drive motor 126. This then introduces a brake pressure at wheel brakes 112 corresponding to the actuation of brake pedal 116.

The chambers of the master brake cylinder assigned to respective brake circuits 120, 122 are supplied with pressure medium via a pressure medium reservoir 144. That pressure medium reservoir 144 is divided into multiple chambers 146, 148, 150 which communicate with one another. Each single chamber 146, 148 is respectively assigned to one of brake circuits 120, 122; a third chamber 150 is directly connected to pressure generator 114.

It is assumed that aforementioned pressure medium reservoir 144 is equipped with a fill level monitoring device, which emits a warning signal as intended when the fill level drops below a predefined minimum value. Furthermore, it is assumed that this fill level monitoring device is situated in third chamber 150 of pressure medium reservoir 144 connected to pressure generator 114.

Pressure generator 114 is activated according to the present invention to check the functionality of this fill level monitoring device. Pressure generator 114 therefore displaces the pressure medium present in its cylinder 128 through correspondingly open check valve 130 into brake circuit 120, 122 until plunger piston 124 has finally reached its outer end stop. In order to thereby prevent a buildup of a brake pressure in brake circuits 120, 122, circuit separating valves 136 are thereby activated in such a way that the pressure medium delivered by pressure generator 114 flows through them and through master brake cylinder 118 into at least one of the two chambers 146, 148 of reservoir 144 assigned to one of the two brake circuits 120, 122.

Check valves 130 are now closed by electronic control unit 142 in order to temporarily decouple pressure generator 114 from brake circuits 120, 122 and plunger piston 124 moves back in the direction of its inner stop due to the reversal of its drive direction. Plunger piston 124 thereby sucks pressure medium out of assigned third chamber 150 of reservoir 144 into cylinder 128 via a line 154 controlled by a return valve 152. When the plunger piston has arrived at its inner stop, check valves 130 open again, the drive direction of plunger piston 124 is reversed again, plunger piston 124 travels across the orifice cross section of line 154 and consequently pumps another quantity of pressure medium into at least one of chambers 146, 148 of reservoir 144 assigned to one of brake circuits 120, 122. This process is repeated until third chamber 150 of reservoir 144 assigned to pressure generator 114 has reached its minimum fill level and the fill level monitoring device responds. The number of necessary actuating cycles or the actuation duration of pressure generator 114 until chamber 150 of reservoir 144 is emptied to the minimum fill level may be ascertained from the known geometric design variables, such as the volume of pressure medium displaced per plunger stroke; the volume of chamber 150 assigned to pressure generator 114; the minimum fill level volume of chamber 150; the speed of plunger piston 124 in the extension or retraction direction, etc., and predefined by electronic control unit 142. During this period, the signal of the fill level monitoring device is thereupon monitored in electronic control unit 142, whether a continuous signal change takes place or a signal jump occurs, as is to be expected by a response of the fill level monitoring device toward the end of the period. If yes, then a proper function of the fill level monitoring device may be inferred and a warning signal to the driver is suppressed. In this case, the method is repeated at a later point in time, preferably after a longer idle period of the vehicle or, for example, each time that a renewed startup of the vehicle drive is carried out.

If, in contrast, no continuous or steady signal change takes place, or no signal jump is determinable in the observation period, this indicates a malfunction of the fill level monitoring device and a corresponding warning signal is emitted to the driver by control unit 142. A suitable warning signal may be a visual, an acoustic, and/or an haptic signal.

The recycled volume of pressure medium may automatically flow back via the equalizing opening between at least one pressure medium chamber 146, 148 of brake circuit 120, 122 and pressure medium chamber 150 of pressure generator 114 until the pressure medium levels in chambers 146 through 150 have equalized again. With knowledge of the cross-sectional dimensions of this pressure medium connection or the volume flow through the pressure medium connection, conclusions about the quality of the pressure medium may be derived from the time necessary for this, for example, about its viscosity, its temperature, and/or the degree of contamination. If necessary, a recommendation for exchanging the pressure medium may be emitted to the driver by electronic control unit 142. The time detected thereby is that time that elapses following the end of the observation period until the fill level monitoring device emits the signal indicated before the observation period.

Figure 2:
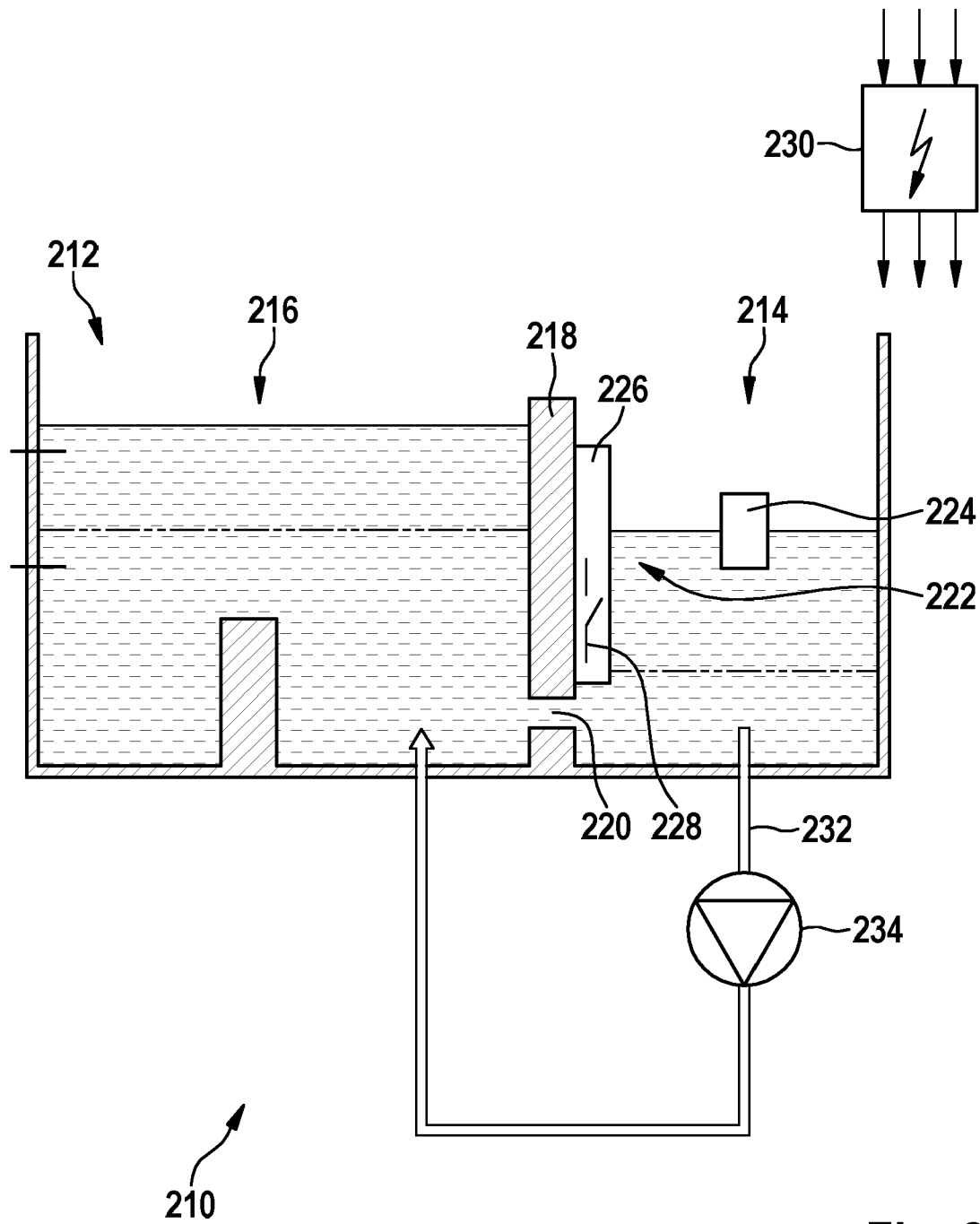
FIG. 2 shows a schematically simple pressure medium circuit.

FIG. 2 shows a schematically simple pressure medium circuit 210 having a pressure medium reservoir 212, whose reservoir space is divided into two pressure medium chambers 214, 216 that communicate with one another. The two pressure medium chambers 214, 216 are separated from one another, for this purpose, with the aid of a partition 218, which has an equalizing opening 220 with a predefined opening cross section at the end facing the bottom of pressure medium reservoir 212. The two pressure medium chambers 214, 216 are differently designed with respect to their volumes, the smaller of the two pressure medium chambers 214 being equipped with a fill level monitoring device 222. This fill level monitoring device 222 is, by way of example, a float gauge 224, equipped with a magnet, which is guided along a sensor element 226. A switch contact 228 is situated, for example, at sensor element 226 at a point in the interior of pressure medium chamber 214, which marks a minimum fill level of pressure medium reservoir 212. The fill level of pressure medium reservoir 212 should not drop below this minimum fill level.

However, if this case occurs, then the magnet carried by float gauge 224 effectuates, depending on the configuration of switch contact 228, that two contacts close or an existing connection between two contacts is interrupted. These types of switch contacts 228 are also known as reed contacts. Alternatively to switch contacts 228, float gauge 224 may also be used to actuate a potentiometer fixed at sensor element 226, at which different resistance values are set by float gauge 224 depending on the fill level of pressure medium chamber 214, 216. Fill level changes thus effectuate a continuous or steady change of the output signal of sensor element 226.

An electronic control unit 230 is additionally present, which detects and evaluates the respective output signal of sensor element 226.

Outside of pressure medium reservoir 212, the two pressure medium chambers 214, 216 are coupled via a pressure medium connection 232. A pressure medium delivery unit 234, which is able to deliver pressure medium from the first, smaller pressure medium chamber 214 into the second, larger pressure medium chamber 216 of pressure medium reservoir 212, is located in this pressure medium connection 232 in order to thus lower the fill level in first pressure medium chamber 214.

Figure 3:
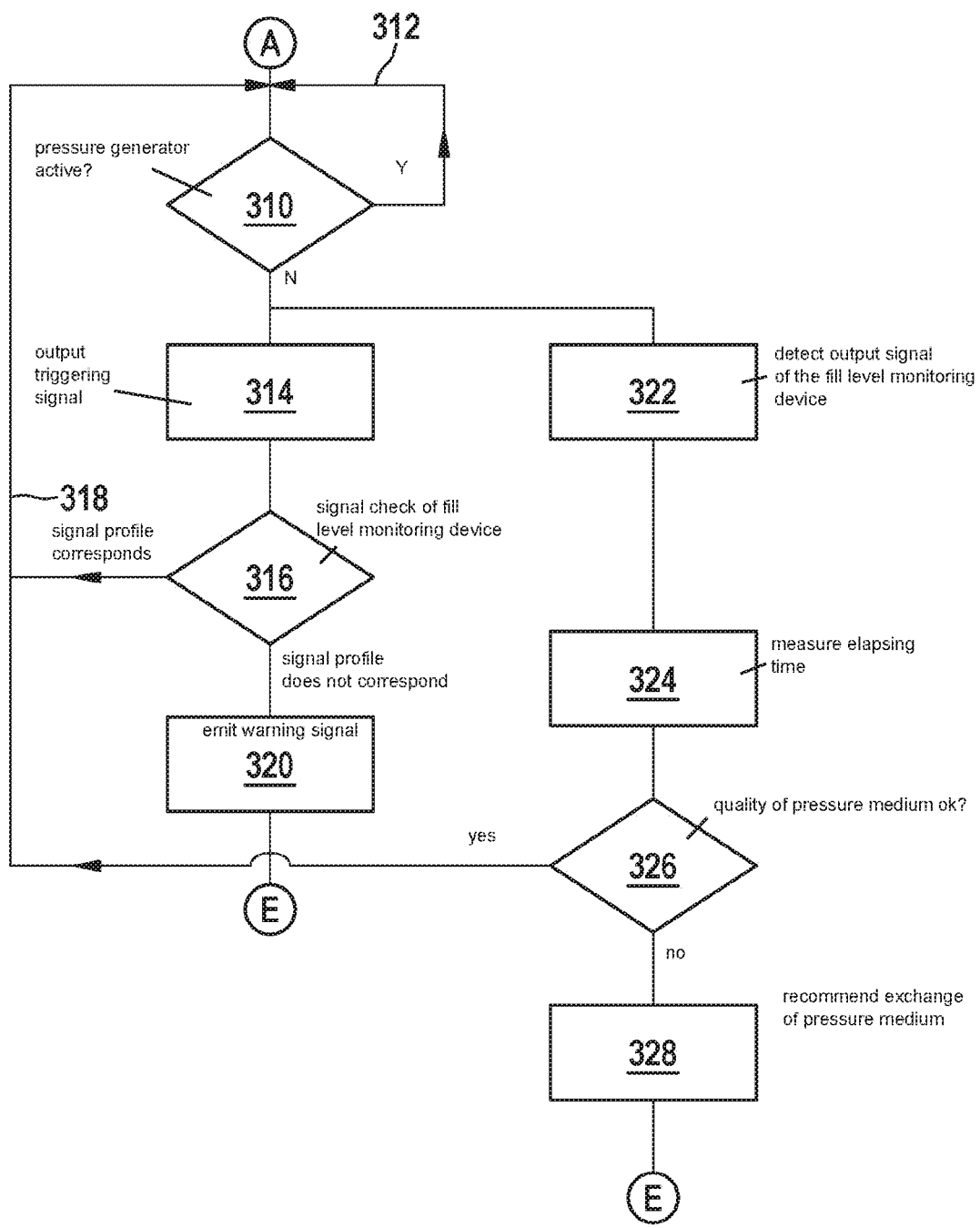
FIG. 3 shows an example method underlying the present invention on the basis of a flow chart.

FIG. 3 illustrates the method again, already explained in connection with FIGS. 1 and 2, with the aid of a flow chart.

It is initially established in a first step 310 of this method whether the pressure generator of the hydraulic circuit is electronically activated or is not in use. If the pressure generator is in use, then the method is ended according to path 312 and restarted at a later time.

If the pressure generator is not active, then the output of a triggering signal to a drive motor of the pressure generator and thus its startup is carried out by an electronic control unit in second step 314. The triggering signal is emitted for a predefinable period, this period being determined by the duration which the pressure generator requires in order to lower the fill level in the first pressure medium chamber of the reservoir to a minimum fill level. It is accordingly dependent on the present pressure medium volume in the chamber of the pressure medium reservoir, on the minimum pressure medium volume, and on the delivery quantity of the pressure generator per time unit, and thus ultimately on the viscosity of the pressure medium, and is, due to the known geometric design of the pressure generator and the pressure medium reservoir, determinable by the line cross section or the ambient temperature and/or predefinable by the electronic control unit.

During the period of an actuation of the pressure generator, a signal check of the fill level monitoring device (position 316) is carried out in an electronic control unit. It is thereby checked whether the signal steadily changes or if a signal jump takes place toward the end of the observation period. If one of these events occurs, then a proper operating state of the fill level monitoring device is assumed and the emission of a warning signal to the driver is suppressed by the electronic control unit. The method is thus ended and is restarted again (position 318) at a later point in time.

However, if the signal profile does not correspond to these expectations, a malfunction of the fill level monitoring device is present and, according to position 320, a warning signal, preferably an acoustic, visual, and/or haptic warning signal is emitted to the driver.

In an advantageous embodiment, the described method is regularly carried out, for example, after longer idle times of a vehicle or during each new startup of a drive of the vehicle.

In a method phase parallel to this method phase, the output signal of the fill level monitoring device is detected at the point in time before the electronic triggering of the drive motor of the pressure generator (position 322).

After the expiration of the period of an actuation of the pressure generator to lower the fill level in the pressure medium chamber to the minimum value, the elapsing time is measured (position 324) until the fill level monitoring device displays this output signal again. This period thus indicates how long it takes until the pressure medium levels in the at least two pressure medium chambers of a reservoir have again harmonized with one another. By knowing the ambient temperature or the pressure medium viscosity in the new state and the flow cross section of the equalizing opening in the partition between the pressure medium chambers of the reservoir, conclusions about the quality of the pressure medium may be drawn by the electronic control unit from the time duration (position 326), the instantaneous viscosity, its water content or its contamination, etc. being understood as the quality of the pressure medium. If necessary, a recommendation for exchanging the pressure medium may be output by the electronic control unit (position 328). Otherwise, a recommendation of this type is suppressed and this quality check of the pressure medium is restarted at a later point in time. The established quality of the pressure medium may be considered by electronic control unit 142 during the calculation of control signals for setting a brake pressure in brake circuits 120, 122 by pressure generator 114 and valves 132, 134, shown in FIG. 1.

Changes or supplements beyond the described exemplary embodiment of the method underlying the present invention are naturally possible without departing from the basic aspects of the present invention.

What is claimed is:

1. A method for functional testing of an electromechanical fill level monitoring device in a first pressure medium chamber of a pressure medium circuit whose pressure is regulated using an electronic control unit, the pressure medium circuit including at least one second pressure medium chamber separated from the first pressure medium chamber, the first pressure medium chamber and the second medium chamber being connected to each other by a pressure medium connection, the pressure medium circuit further including an electronically activatable pressure medium delivery unit situated in the pressure medium connection between the first and second pressure medium chambers, the method comprising the following steps:
- activating the pressure medium delivery unit over an established period to deliver pressure medium contained in the first pressure medium chamber into the second pressure medium chamber;
- detecting and evaluating, by the electronic control unit, a signal profile of the fill level monitoring device within the established period; and
- emitting a warning signal by the electronic control unit when no signal jump or no continuous signal change is detected in the signal profile within the established period.

2. The method as recited in claim 1, wherein the pressure medium circuit is a brake circuit of an electronic slip-controllable vehicle braking system.

3. The method as recited in claim 1, wherein the output of a warning signal is suppressed when a signal jump or a continuous signal change is detected in the signal profile by the electronic control unit.

4. The method as recited in claim 1, wherein the method is carried out at regularly recurring intervals.

5. The method as recited in claim 1, wherein the method is carried out during a startup of a drive of the vehicle.

6. The method as recited in claim 1, wherein the pressure medium circuit is a brake circuit of an electronic slip-controllable vehicle braking system which is equipped with a master brake cylinder, a wheel brake, an electronically activatable circuit separating valve between the master brake cylinder and the wheel brake, and an electronically activatable check valve between the pressure generator and the wheel brake, and wherein the check valve and the circuit separating valve are activated by the electronic control unit to carry out the method in such a way that the check valve and the circuit separate valve are each in a passage position.

7. The method as recited in claim 1, where first and second pressure medium chambers communicate the pressure medium with one another via an equalization opening, wherein, after the expiration of the established period, a time is measured by the electronic control unit until a signal of the fill level monitoring device assumes a value that was present at a beginning of the established period, and a quality of the pressure medium is judged by the electronic control unit from the measured time.

* * * * *